Aug. 23, 1960

R. C. LAMPE 2,949,624

SUCTION NOZZLE

Filed Nov. 25, 1957

INVENTOR.
Robert C. Lampe
BY
Thomas C. Betts
HIS ATTORNEY

Aug. 23, 1960  R. C. LAMPE  2,949,624
SUCTION NOZZLE
Filed Nov. 25, 1957

INVENTOR.
Robert C. Lampe
BY
Thomas C. Britts
HIS ATTORNEY

United States Patent Office 2,949,624
Patented Aug. 23, 1960

2,949,624
SUCTION NOZZLE

Robert C. Lampe, Stamford, Conn., assignor to Electrolux Corporation, Old Greenwich, Conn., a corporation of Delaware Filed Nov. 25, 1957, Ser. No. 698,640

5 Claims. (Cl. 15—356)

My invention relates to suction nozzles and more particularly to a nozzle for use in connection with a tank type vacuum cleaner in which the nozzle is connected to the source of suction by means of a rigid manipulating wand and a flexible hose. In a nozzle of this type, which is remote from the motor driving the fan, it is impractical to provide a rotary brush or other surface agitating member driven by the fan motor.

In accordance with my invention a rotary agitating member is arranged to be driven through a gear train by surface contacting wheels which are caused to rotate as the nozzle is moved back and forth over the surface being cleaned. One of the objects of my invention is to so arrange the rotary agitating member that it floats with respect to the remainder of the nozzle in order that it may properly position itself with respect to the surface. This is accomplished by providing arcuate slots in the end walls of the nozzle for receiving shafts extending from the ends of the agitator, together with spring pressed members bearing against the upper sides of the shafts in order to urge them towards the lower ends of the slots. These shafts carry pinions which mesh with idler gears mounted on shafts carried by the end walls and the arcuate slots are concentric with these shafts, thus permitting the agitator to move up and down in the slots without interfering with the engagement of the pinion gears with the idler gears.

Another object of my invention is to provide for vertical adjustment of the surface engaging wheels. To accomplish this the wheels are rotatably mounted in wheel supporting members which are pivotally mounted at the ends of the nozzle in order that the wheels may be vertically adjusted with respect to the nozzle body. These wheels are formed with internal gears which mesh with the aforesaid idler gears and the wheel supporting members are pivotally mounted concentric with the idler gear shafts in order that vertical movement of the wheels will not interfere with the engagement of the internal gears with the idler gears.

Further objects and advantages of my invention will be apparent from the following description considered in connection with the accompanying drawings which form a part of this specification and of which;

Figure 1:
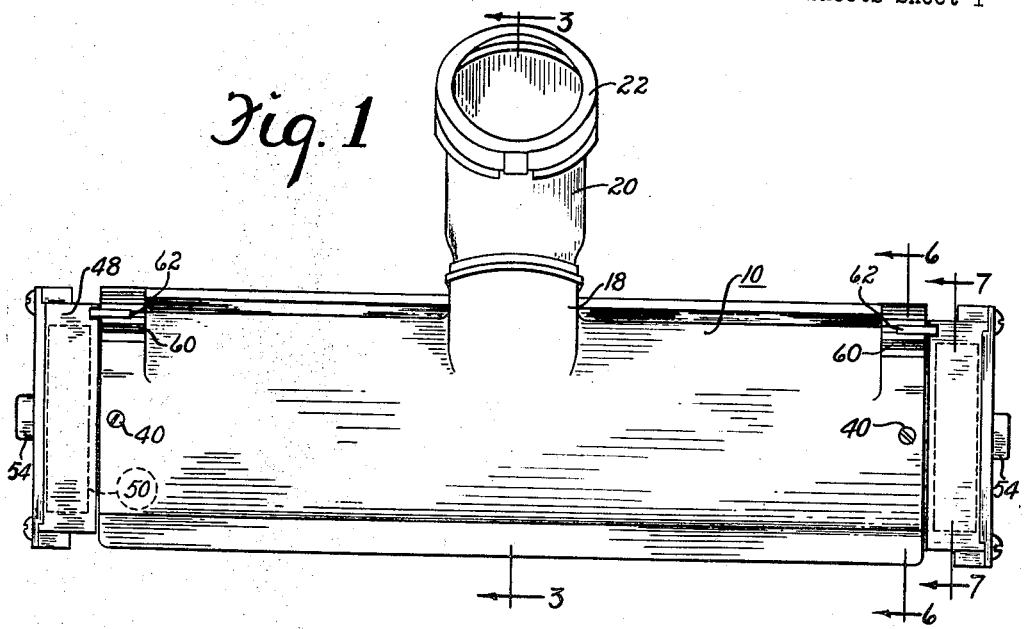
Fig. 1 is a top view of a nozzle in accordance with my invention.
Figure 2:
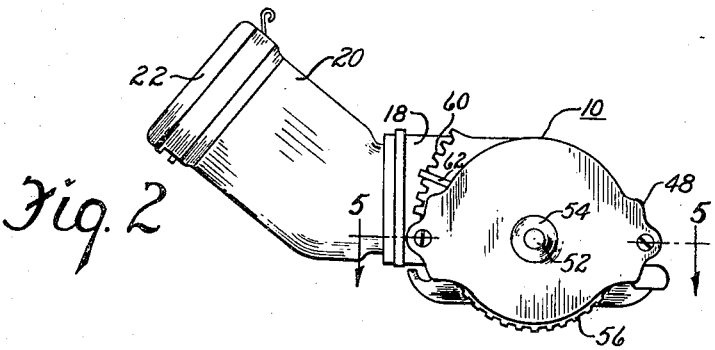
Fig. 2 is an end view of the nozzle shown in Fig. 1.
Figure 3:
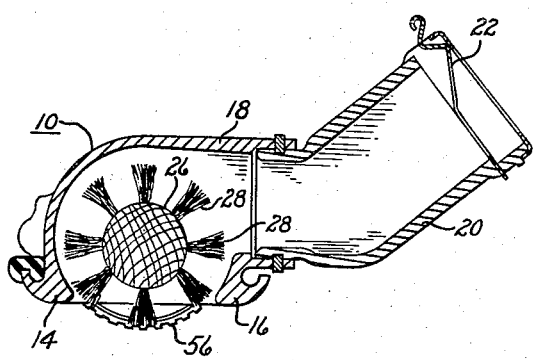
Fig. 3 is a cross-sectional view taken on the line 3—3 of Fig. 1.
Figure 4:
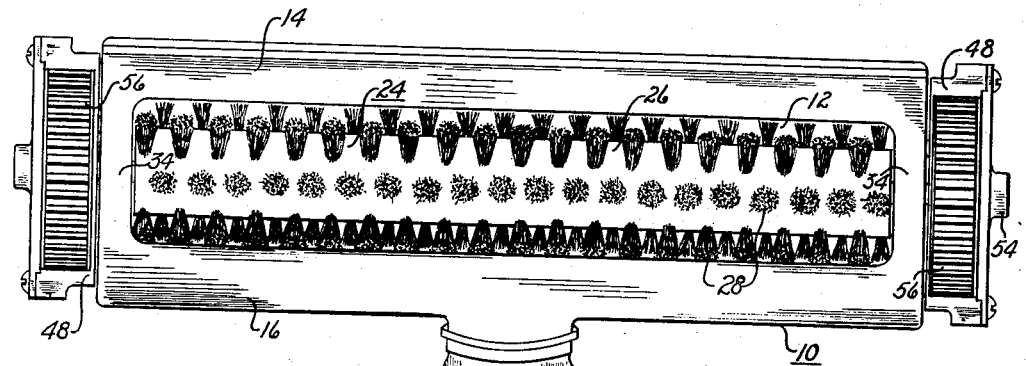
Fig. 4 is a bottom view of the nozzle shown in the preceding figures.
Figure 5:
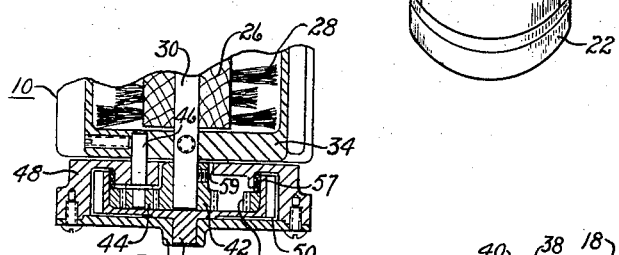
Fig. 5 is a cross-sectional view taken on the line 5—5 of Fig. 2.

Referring to the drawings, reference character 10 designates generally a nozzle body formed with an elongated suction opening 12 bounded by lips 14 and 16. The body 10 is generally hollow and is provided with a centrally located rearwardly extending tubular portion 18 to which is rotatably connected an elbow member 20, the outer end of which is provided with a locking arrangement 22 for removably connecting the elbow to the end of a suction conduit, not shown.

Figure 6:
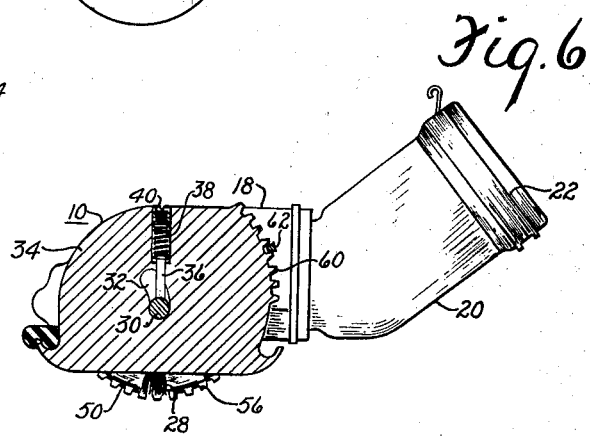
Fig. 6 is a cross-sectional view taken on the line 6—6 of Fig. 1.
Figure 7:
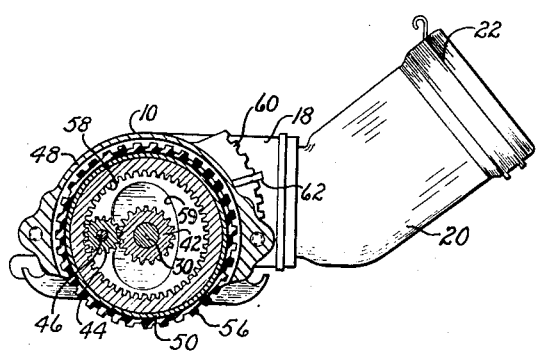
Fig. 7 is a cross-sectional view taken on the line 7—7 of Fig. 1.

Disposed in the suction opening 12 is a rotary surface agitating member 24 which, as shown, comprises a hub 26 to which is secured a plurality of bristle tufts 28. A shaft 30 is secured to each end of the hub 26 and extends outwardly through an arcuate slot 32 formed in the end wall 34 of the nozzle body, as is more particularly shown in Fig. 6. The end wall is also formed with a vertically extending bore the lower end of which communicates with the arcuate slot 32. A plunger member 36 is urged downwardly against the upper surface of shaft 30 by means of a spring 38 retained in the bore by a threaded plug 40.

Secured to the end of each shaft 30 on the outer side of the end wall 34 is a pinion 42 which meshes with an idler gear 44 rotatably mounted on a stub shaft 46 extending outwardly from the end wall. Slot 32 is concentric with the shaft 46 so that the agitator shaft 30 may move up and down in the slot without interfering with the engagement of the gears 42 and 44.

Pivotally mounted on the stub shaft 46 between the idler gear 44 and the end wall 34 is a wheel supporting casing member 48. A surface engaging wheel 50 is provided with a short outwardly extending shaft 52 which is rotatably received within a bushing 54 of the casing 48 so as to rotatably mount the wheel 50 within the casing. The lower portion of the casing is open so as to expose the lower part of the tread 56 of the wheel 50 so that it may engage and roll on the surface being cleaned. Wheel 50 is formed with an internal gear 58 which meshes with the idler gear 44. Preferably a felt washer 57 is provided between the inner surface of the wheel adjacent to the gear 58 and an internal flange on the casing 48 to protect the gears from dust and dirt. Due to the fact that the casing 48 is pivotally mounted about the shaft 46 of the idler gear, the casing may be pivoted so as to raise and lower the wheel 50 with respect to the nozzle body without interfering with the engagement of the internal gear with the idler gear. The inner wall of the casing 48 is formed with an arcuate opening 59 to accommodate the hub of pinion 42. The nozzle body 10 is provided with an arcuate rack 60 which is concentric with the idler shaft 46, while the wheel casing 48 carries a spring detent 62 which cooperates with the rack to retain the casing and consequently the wheel 50 in selected positions of adjustment. By utilizing an internal gear on the wheel 50 there is obtained the desired direction of rotation of the agitator 24, namely opposite to that of the wheel, while at the same time it is possible to closely encase the wheel in the casing 48.

In operation, as the nozzle is moved back and forth over a surface being cleaned, such as a rug or carpet, the wheels 50 are caused to rotate by virtue of their engagement with the surface. This rotation is transmitted through the gear train comprising the internal gear 58, the idler gear 44 and the pinion 42 so as to cause the agitator 24 to rotate in a direction opposite to the direction of the rotation of the wheels. This causes the bristles 28 to move relatively to the surface of the carpet or rug, thus agitating the surface and dislodging dust and dirt therefrom which is picked up by the air stream entering the nozzle through the suction opening 12 and passing out through the elbow 20.

As the nozzle is moved back and forth over the surface the agitator member 24 may accommodate itself to the surface by shafts 30 thereof moving up and down in the vertical arcuate slots 32 against the action of the springs 38, the agitator brush thus being self adjusting.

The operator may adjust the position of the wheels relative to the nozzle body in order to cause them to properly engage the surface. With a deep pile rug it is desirable to have the wheels extend further below the nozzle lips 14 and 16, than with a short pile rug, in order that they may have proper engagement and not slip as the nozzle is moved back and forth. On the other hand, this same adjustment if used on a short pile rug would cause the nozzle lips and the rotary agitator to be spaced too far from the surface of the rug, and consequently the wheels should be raised relative to the nozzle body by pivoting the wheel casings 48 in the proper direction about the shafts 46, the spring detents 62 serving to retain the casings in selected positions of adjustment.

Although the nozzle has been described as having a gear train between each of the wheels 50 and the rotary agitator 24, obviously one of these trains could be omitted and the drive be from one wheel only. While I have shown and described one more or less specific embodiment of my invention, it is to be understood that this has been done for purposes of illustration only, and that the scope of my invention is not to be limited thereby, but is to be determined from the appended claims.

What I claim is:

1. In a vacuum cleaner nozzle, a hollow body formed with an elongated suction opening, a surface agitator rotatably mounted in said opening, a pair of surface engaging wheels, a gear train including a gear fixed to one of said wheels, an idler gear meshing therewith and with a gear fixed to said agitator for transmitting rotation from said wheel to said agitator, and means for mounting said wheels and said agitator, respectively, for independent vertical movements each with respect to said body through arcuate paths about a common center concentric with the center of said idler gear.

2. In a vacuum cleaner nozzle, a hollow body formed with an elongated suction opening, a surface agitator rotatably mounted in said opening, a gear fixed to said agitator, an idler gear meshing therewith and rotatably mounted on said body, a pair of wheel supporting members pivotally mounted on said body about an axis concentric with the center of said idler gear, a surface contacting wheel rotatably mounted on each of said supporting members and vertically adjustable with respect to said body and to said agitator by pivoting of said supporting members, a gear fixed to one of said wheels and meshing with said idler gear, and means for retaining said supporting members in selected positions of vertical adjustment.

3. In a vacuum cleaner nozzle, a hollow body formed with an elongated suction opening, a surface contacting wheel rotatably mounted at each end of said body, a gear fixed to one of said wheels, an idler gear meshing therewith and rotatably mounted on said body, a surface agitator disposed in said opening, a shaft extending from each end of said agitator and received in vertically extending arcuate slots formed in the opposite ends of said body, said slots being concentric with the center of said idler gear, a gear fixed to one of said shafts and meshing with said idler gear, and resilient means urging said shafts towards the lower ends of said slots.

4. In a vacuum cleaner nozzle, a hollow body formed with an elongated suction opening, a surface agitator disposed in said opening, a gear fixed to said agitator, an idler gear meshing therewith and rotatably mounted on said body, a shaft extending from each end of said agitator and received in vertically extending arcuate slots formed in the opposite ends of said body and concentric with the center of said idler gear, a pair of wheel supporting members pivotally mounted on said body about an axis concentric with the center of said idler gear, a surface contacting wheel rotatably mounted on each of said supporting members, a gear fixed to one of said wheels and meshing with said idler gear, and means for retaining said supporting members in selected positions of vertical adjustment.

5. In a vacuum cleaner nozzle, a hollow body formed with an elongated suction opening, a surface agitator rotatably mounted in said opening, a gear fixed to each end of said agitator, a shaft mounted on each end of said body, an idler gear rotatably mounted on each shaft and meshing with one of the gears on said agitator, a circular wheel supporting casing member pivotally mounted on each of said shafts, a surface contacting wheel rotatably mounted in each of said casing members and vertically adjustable with respect to said body and to said agitator by pivoting of said supporting casing members, an internal gear on each of said wheels meshing with one of said idler gears, and means for retaining said wheel casings in selected positions of pivoted adjustment.

References Cited in the file of this patent

UNITED STATES PATENTS

| | | |
|---|---|---|
| 1,268,988 | Mason | June 11, 1918 |
| 1,613,396 | Keller | Jan. 4, 1924 |
| 2,696,017 | Hall | Dec. 7, 1954 |

FOREIGN PATENTS

| | | |
|---|---|---|
| 464,048 | Great Britain | Apr. 12, 1937 |